July 4, 1950   F. W. MEREDITH   2,514,250
DEVICE FOR DETECTING OR MEASURING RATE OF TURN
Filed Feb. 21, 1944   3 Sheets-Sheet 1
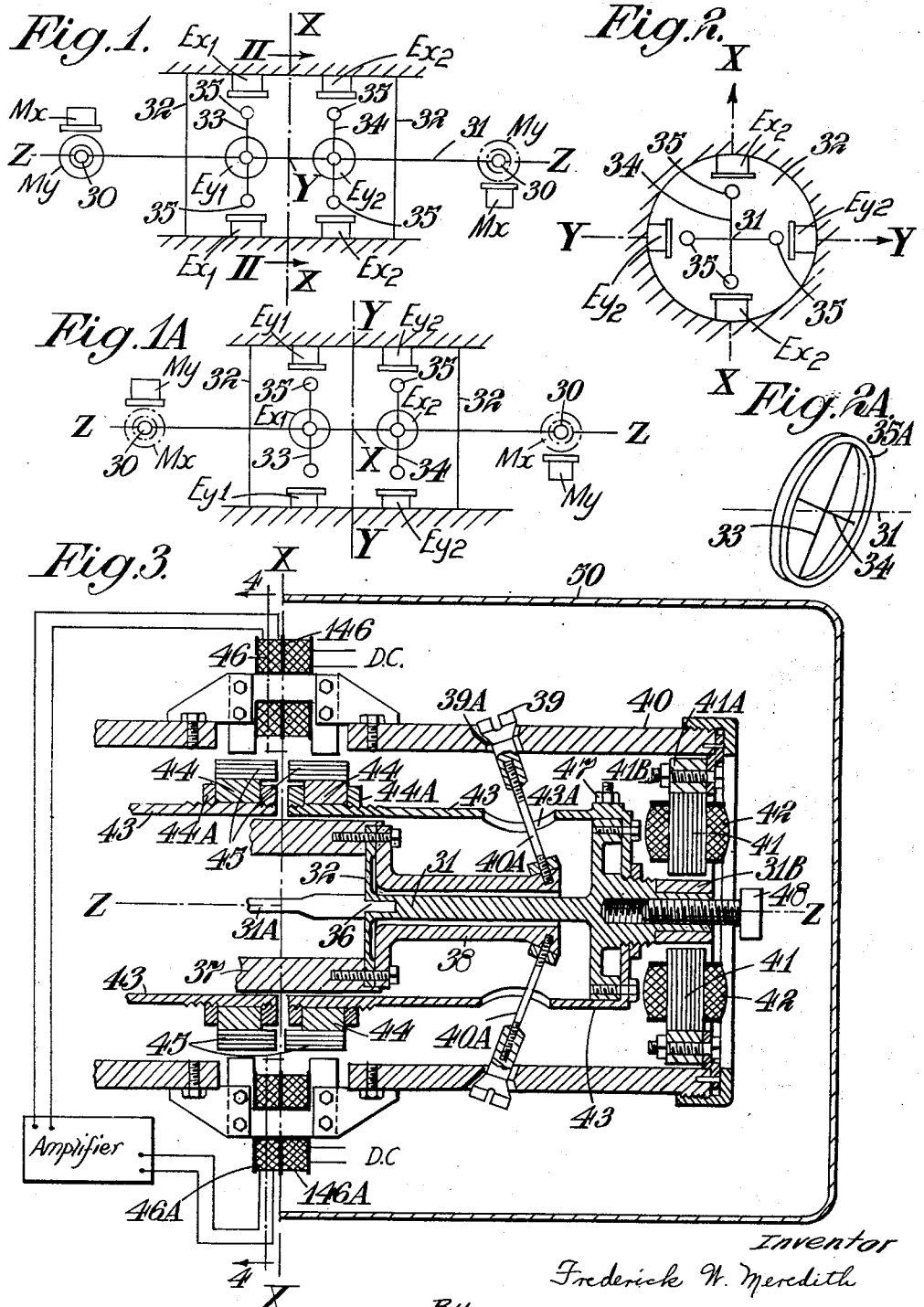
Inventor
Frederick W. Meredith
By Watson, Cole, Grindle & Watson
Attorneys July 4, 1950  F. W. MEREDITH  2,514,250
DEVICE FOR DETECTING OR MEASURING RATE OF TURN
Filed Feb. 21, 1944  3 Sheets-Sheet 2
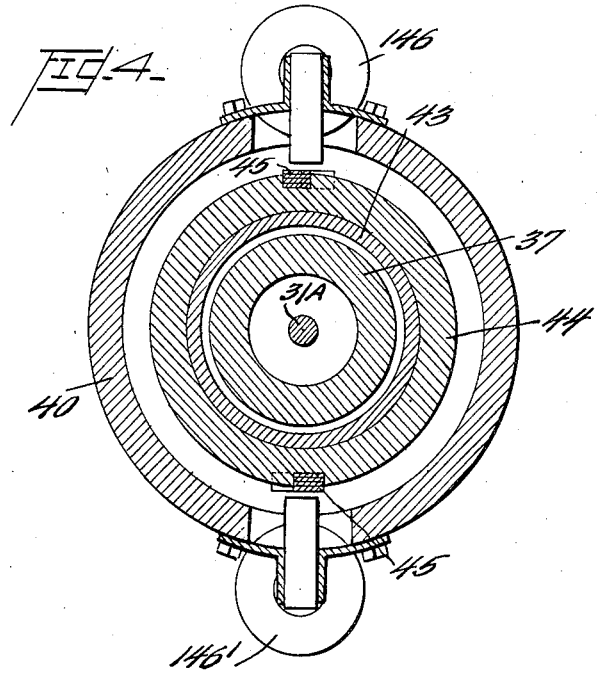
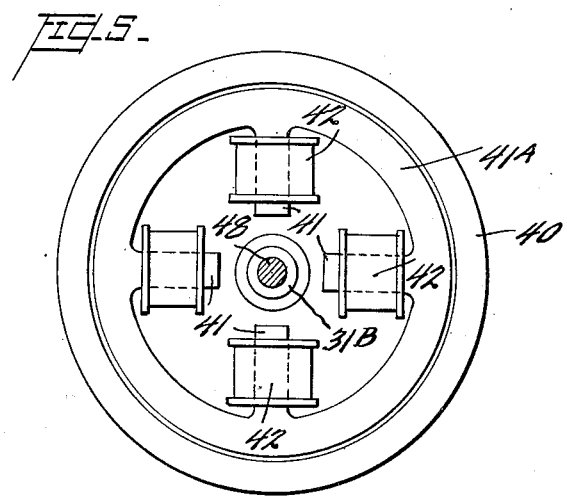
Inventor
Frederick W. Meredith
By Watson, Cole, Grindle & Watson
Attorney

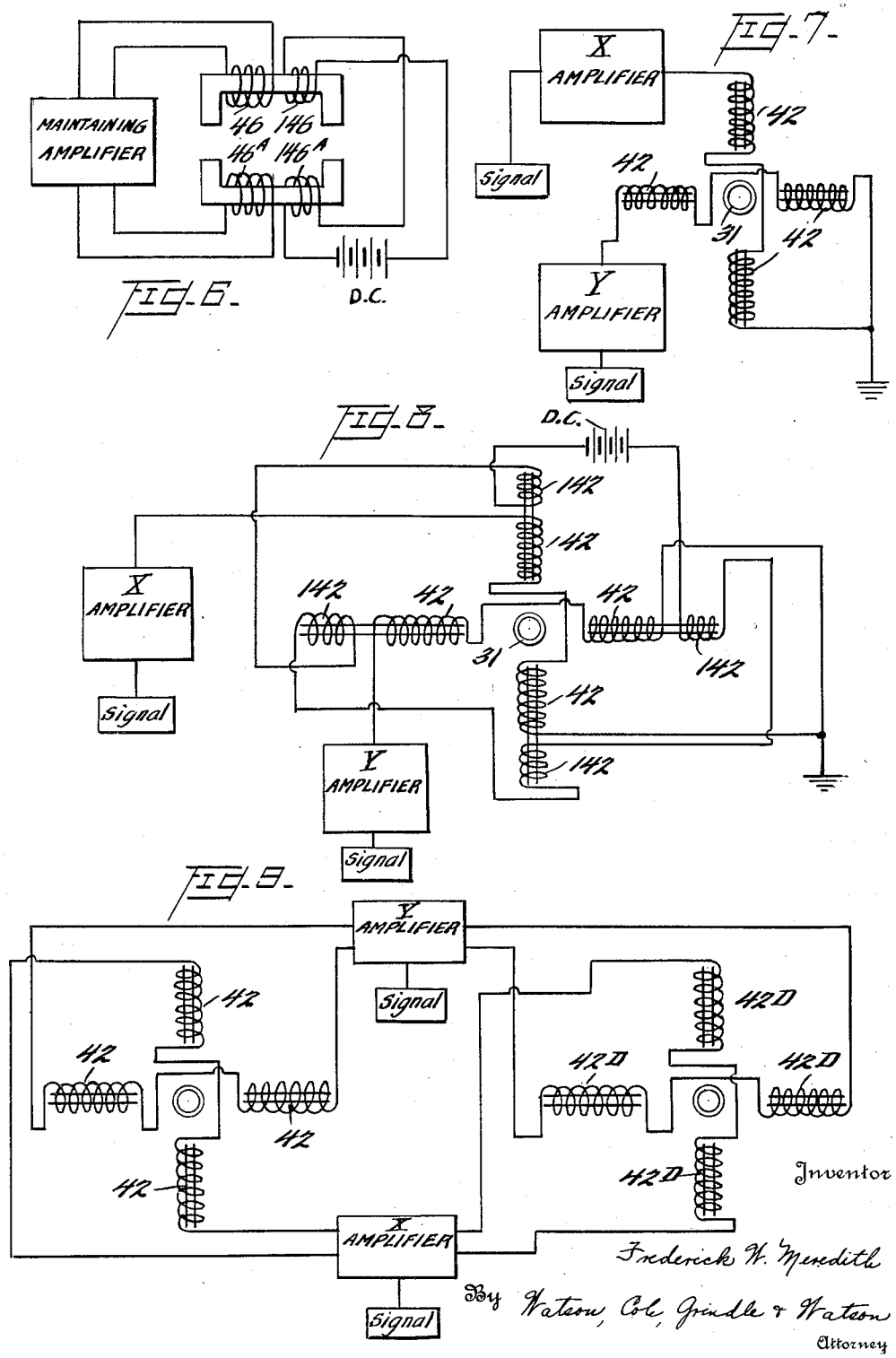

Patented July 4, 1950

2,514,250

UNITED STATES PATENT OFFICE 2,514,250

DEVICE FOR DETECTING OR MEASURING RATE OF TURN

Frederick William Meredith, Cricklewood, London, England, assignor to S. Smith & Sons (England) Limited, a British company Application February 21, 1944, Serial No. 523,340
In Great Britain January 13, 1943

Section 1, Public Law 690, August 8, 1946
Patent expires January 13, 1963

14 Claims. (Cl. 264—1)

This invention relates to improvements in devices for detecting or measuring rate of turn of the kind described in United States Application Ser. No. 504,072, filed September 27, 1943, now Patent No. 2,455,939, and has for its principal object the provision of means for detecting or measuring rate of turn about two axes at right angles.

According to the earlier invention which is the subject of application Ser. No. 504,072, a device for detecting or measuring rate of turn comprises a mass forced to oscillate along a predetermined path and means for detecting or measuring the periodic force along a normal to said path due to a component of rate of turn about a normal to said path and to said first normal. Preferably the mass is free to oscillate in the direction of the first normal against resilient restraint and means for detecting or measuring the force due to a component of rate of turn measures or detects the said oscillations in the direction of the first normal.

It is, however, an object of the present invention to provide two oscillatory systems such that upon rotation of the device about either or both of two orthogonal axes, there will be set up resultant oscillations in different planes which may be read and employed for controlling purposes by certain pick-off devices preferably of an electrical nature similar in some respects to those used in the aforesaid copending application.

The invention, in one embodiment, contemplates the provision of two masses which are forced to vibrate in directions at right angles to each other so that their cross vibrations produce vibrations in a common supporting member, and means for measuring the periodic force due to turn about either of two axes of the instrument, which periodic force is measured by the amplitude of the vibrations in the supporting member.

In another embodiment of the invention, the object is to provide a second oscillatory system linked with a first system set up substantially in accordance with the aforesaid copending application, but in which the second system includes an oscillatory mass which is set in oscillation by those oscillations of the mass of the first system which are set up in the direction of the normal to the plane of forced vibrations of the mass of said first system; and in this case the means for detecting the turn or measuring the rate of turn is adapted to detect or measure the resultant oscillations of the second system.

In a still further form, the invention contemplates the provision of a device for detecting turn or measuring rate of turn about two axes, say the X axis and the Y axis which are at right angles to each other, which device comprises a flexible shaft lying along the third axis, i. e., the Z axis which is perpendicular to both the X and Y axes, the shaft being supported at two nodal points by flexible radial members, two masses such as wheels being supported radially on said shaft and subjected to rotational oscillations in opposite directions. According to this embodiment of the invention means are provided for measuring the amplitude of the vibrations of said shaft either in the direction of the X axis, due to a component of rate of turn about the Y axis, or in the direction of the Y axis, due to a component of rate of turn about the X axis.

Further objects and features of novelty will be apparent from the following specification when read in connection with the accompanying drawings in which certain exemplary embodiments of the invention are illustrated. Among these features and objects is the provision of means for balancing the oscillatory systems to prevent dissipation of energy, means for preventing air damping, means for differentially damping the first and second oscillatory systems, and certain alternative forms of the oscillatory masses.

In the accompanying drawings,

Figure 1 shows diagrammatically a device for measuring rate of turn about two axes at right-angles, viz., the X axis and the Y axis while the Z axis is the direction of the supporting shaft;

Figure 1A is a similar longitudinal sectional view taken along the Z axis and at right angles to the plane of Figure 1;

Figure 2 is a section on the line II—II of Figure 1;

Figure 2A is a fragmentary perspective view of a modified form of oscillatory mass;

Figure 3 is a longitudinal sectional view illustrating diagrammatically about one half of a device constituting a practical example of this invention.

Figure 4 is a transverse sectional view taken approximately along the line 4—4 of Figure 3;

Figure 5 is an end view in somewhat diagrammatic form of the device shown in Figure 3;

Figure 6 is a wiring diagram showing the connections for the driving and polarizing coils employed in the device shown in Fig. 3 of the drawings;

Figures 7 and 8 are wiring diagrams showing respectively the arrangement of the end coils 42 in the case where the armature is a permanent magnet, and in the case where polarizing D. C. coils are used; and Figure 9 is a wiring diagram of the system in which forced damping is employed.

Any device may be described with reference to three orthogonal axes and, in the present specification and in the claims, reference will be made to the three orthogonal axes called the X axis, the Y axis, and the Z axis. Preferably the Z axis will be the one which coincides with the axis of the flexible shaft mounting the oscillatory masses, and the X and Y axes will be those about which rates of turn are to be measured.

Furthermore, when it is stated that certain masses which are radially supported, oscillate in the direction of one or the other of said axes, it is meant that the straight or arcuate paths of the masses are in the general direction of said axes, that is, chords subtending the arcs of movement of said masses are parallel to the axes mentioned. Also, when it is stated that oscillations in the direction of certain axes resulting from turn, are measured, it is meant that the components of the possible complex movements of the masses or of the supporting means along said axis are being measured.

Referring now more particularly to Figures 1 and 2, a flexible mass-loaded shaft 31 is supported at its nodal points by two flexible diaphragms 32. Two four-spoked rimless wheels 33 and 34 are rigidly mounted on the shaft 31, and each spoke carries a mass 35 on its free end, the wheels being balanced about the nodal points by masses 30 at the free ends of the shaft.

In operation the two wheels are caused to oscillate in opposite directions by means of two or more of the electromagnets $Ex^1$ and $Ex^2$, comparable to the equivalent magnets shown in Figures 7 and 8 of said Patent No. 2,455,939, and energized by similar electric circuits carrying pulsating current. The oscillations are set up in opposite phase so that the couples applied to the two diaphragms are balanced.

If a turn takes place about the axis X the top pair of masses 35 shown in Figure 1 will move towards (or away from) one another and the bottom pair will move away from (or towards) one another. This will cause an oscillating bending moment to be applied to the shaft 31 causing transverse oscillation of the free ends of the shaft 31 in the plane of the paper in Figure 1. A microphone $Mx$ operated by the deflection of the free ends will produce an E. M. F. proportional to the rate of turn about the axis X. It will be observed that all forces imposed on the supports are also balanced.

In a similar manner if a turn takes place about the axis Y the free ends 30 of the shaft 31 will be deflected in a direction at right-angles to the plane of the paper in Figure 1, and a microphone $My$ operated by their deflections can be used for measuring the rate of turn about the Y axis. If desired the masses may be replaced by wheel rims 35A of suitable mass, as suggested in the fragmentary Figure 2A.

When the device just described is operated in accordance with one form of the invention, one of the masses 35 (say the left-hand mass) is oscillated in the direction of the X axis, that is, in the plane of the paper and perpendicular to the Z axis in Figure 1 of the drawings, while the other mass is oscillated in the direction of the Y axis, that is, substantially perpendicular to the plane of the paper. Then the microphones $Mx$ and $My$ will pick off the resultant signals in the X and Y directions due to rate of turn about the X and Y axes, and this signal will be translated into rate of turn or used to operate controllers such as for an aircraft or the like. The signal yielded by the device is, as in the case of the application referred to, an alternating voltage the amplitude of which is a measure of the rate of turn. According to another embodiment as described in the stated objects of the invention, one of the wheels 35 may be set in oscillation along one axis and the resultant force due to rate of turn about that axis may be employed to set the second wheel or mass into oscillation along the second axis, and the detecting means measures the resultant oscillations of the second mass. In this case the first oscillatory system is preferably very lightly damped (as by means of additional electromagnets) so that very little energy is required to maintain the oscillations of the first system, and any unwanted transfer of energy to the second system is exceedingly small. The second oscillatory system may be heavily damped to insure that the oscillations of the second system rapidly reach an amplitude proportional to the rate of turn.

Referring to Figures 3, 4 and 5, in which is shown a device according to one of the stated objects of the invention in which the masses or wheels are given rotational oscillations, a flexible shaft 31 is carried by two flexible diaphragms 32 at its nodal points 36. To avoid failure due to alternating torsional stresses at joints between the diaphragms 32 and the rod 31, each diaphragm is, as shown, made integral with a part of the rod 31, the rod being in three parts. Figure 3 is symmetrical about the center line X—X and the rod 31 includes the central part 31A and the oppositely extending end portions 31B. The diaphragms are each gripped between an inner cylindrical casing 37 and a flanged sleeve 38 spaced away from the shaft 31, and adjusting screws 39 engaging the outer casing 40 at the universal spherical sockets 39A and spokes 40A attached to the outer ends of the sleeve 38 serve to adjust the ends of the shaft 31 in relation to the four cores 41 of two pairs of electromagnets 42 directed radially towards the end 31B of the shaft 31 (at each end). The poles or cores 41 of the magnets 42 are inward radial extensions of the rings 41A which are secured as by means of the screws 41B to the supporting flange 41C, which is in turn clamped to the cylindrical casing 40 by means of the flanged screw ring 40B. The adjusting screw 48 is provided for fine adjustment of the nodal points of the system so that they are coincident with the points 36 at the centre of the two diaphragms 32.

At each end of the shaft 31 there is supported a cylinder or spider 43 which itself has a certain mass and which further carries a mass 44 (in this case an annular mass). When running, the two "fly-wheel" masses 44 oscillate in opposite directions about the Z axis by twisting the shaft 31, but provided the instrument is not turning, there is no translational movement of the ends 31B of the shaft 31 in the gaps of the cores 41 of the electromagnets 42. The masses 44 carry cores 45 in the magneto-electric circuit of one of the electromagnets 46, 46A (of which there are conveniently two) mounted oppositely on the middle of the outer casing 40, the one designated 46 being a driving magnet and the one marked 46A a pick-up magnet energized by the oscillations of the armature or core portions 45. The masses 44 are shown as axially adjustable on the part 43 by means of the threaded rings 44A, for rough adjustment of the nodal points of the system. The spokes or rods 40A pass through openings 43A in the cylinder 43.

For convenience of reference in describing the invention in relation to Figure 3 the motions will be referred to three orthogonal axes X, Y and Z fixed in the device, the Z azis being the axis of the shaft 31, the X axis lying in the plane of the paper normal to the Z axis and the Y axis being normal to the plane of the paper.

Rotational oscillations about the Z axis are imparted to the masses 44 in opposite senses by the action of the driving electromagnet 46. For this purpose the cores 45 are circumferentially staggered in relation to one another and to the poles of the electromagnet 46. As indicated in Fig. 6 of the drawings, the voltage from the opposite (pick-up) electromagnet 46A is amplified and supplied to the driving electromagnet to maintain the oscillation of the masses 44 in known manner. One example of the means for maintaining the proper oscillations of the masses 44 is suggested in the said Patent No. 2,455,939.

The adjustable nuts 47 (of which there are conveniently three at each end of the cylinder or spider 43) serve to adjust the dynamic balance of the vibratory system so that the dynamic axis is coincident with the axis of the shaft 31.

During a turn about the X axis, the reaction of the masses 44 deflects the diaphragms 32 so that the system vibrates in the plane of the paper with two nodes 36 causing no movement of the outer casing 40. The free ends 31B of the shaft 31 are then vibrating in the gaps between the cores 41 of the two electromagnets 42 lying parallel to the X axis and the rate of turn is measured by the voltages induced in the coils 42 of these electromagnets.

Similarly, during a turn about the Y axis the reaction of the masses 44 deflects the diaphragms 32 so that the system vibrates in a plane normal to the paper and containing the Z axis with two nodes 36 again causing no movement of the outer casing 40. In this case the free ends 31B of the shaft 31 are vibrating in the gaps between the cores 41 of the two electromagnets 42 lying parallel to the Y axis and the rate of turn is measured by the voltages induced in the coils 42 of these electromagnets.

The D. C. flux required to polarise the electromagnet cores 41 may be supplied by making the shaft 31 a "permanent" magnet, as shown in Fig. 7 of the drawings, or alternatively by auxiliary D. C. coils 142, as set forth in the diagram comprising Figure 8 of the drawings.

As in the arrangements shown in Figures 5 and 6 and in Figures 7 and 8 of the specification of said Patent No. 2,455,939, one coil or pair of coils 42D may be used to supply forced damping of one translational motion and another coil or pair of coils 42D at right angles may be used to supply forced damping of the other translational motion, the currents for these coils being supplied by amplifiers, the inputs to which are supplied by the corresponding pick-up coils 42, all as clearly indicated in the wiring diagram comprising Fig. 9 of the drawings.

The pick-up coils and the driving coils may be placed at opposite ends of the instrument to minimise direct magnetic coupling. Magnetic coupling between the main driving coil 46 and the pick-up coils is reduced to a low level by spatial separation.

The two coils 46 and 46A are themselves separated to minimise direct coupling which would tend to upset the stability of the maintaining amplifier. These coils are polarised by D. C. windings 146 and 146A on the same bobbins (see Fig. 6). It will be realized that with the application of alternating current alone there would be two peaks or points of saturation of the magnet during each cycle. By applying the proper combination of D. C. and A. C. current, a pulsating rather than an alternating effect is obtained, and the device is thus polarized, yielding but one peak of saturation per cycle and of the same polarity, thus avoiding "frequency doubling."

It is not necessary to provide the damping coils mentioned above if the natural frequency of oscillation about the Z axis is different from the natural period of vibration of the system about either the X axis or the Y axis. This has the effect of ensuring a quick response without introducing forced damping, the natural damping of the system and the dissipative damping of the currents induced in the coils 42 being sufficient.

As already mentioned, the device is preferably contained in an evacuated envelope such as that indicated at 50 in Figure 3, to prevent dissipation of energy by air damping.

I claim:

1. A device for detecting turn or measuring rate of turn about two axes at right angles comprising two masses, a common support, a base subject to turning movement, means for mounting the two masses on the common support, means for mounting said support on said base, means for forcing the first mass to oscillate in the general direction of one of said axes, means for forcing the second mass to oscillate in the general direction of the other axis, and means for measuring independently the oscillations of the support forced by the first mass due to the turnin of the base about the second named axis and the oscillations of the support forced by the second mass due to turning of the base about the first named axis.

2. A rate-of-turn device referable to three orthogonal axes: X, Y, and Z, and adapted for detecting turn or measuring rate of turn about two axes at right anges, namely the X and Y axes, said device comprising a casing, a flexible shaft lying along the Z axis, at right angles to the X and Y axes, and mounted in said casing, two masses supported on said flexible shaft, means for forcing the first mass to oscillate in the general direction of the X axis, means for forcing the second mass to oscillate in the general direction of the Y axis, and means for measuring independently the oscillations of the flexible shaft forced by the first mass due to the turning of the device about the Y axis and the oscillations of the flexible shaft forced by the second mass due to the turning of the device about the X axis.

3. A rate-of-turn device referable to three orthogonal axes: X, Y, and Z, and adapted for detecting turn or measuring rate of turn about two axes at right angles, namely the X and Y axes, said device comprising a casing, a flexible shaft lying along the Z axis, at right angles to the X and Y axes, and mounted in said casing by flexible radial members at the nodal points of said flexible shaft, two masses supported on said flexible shaft, means for forcing the first mass to oscillate in the direction of the X axis, means for forcing the second mass to oscillate in the direction of the Y axis and means for measuring independently the oscillations of the flexible shaft forced by the first mass due to the turning of the device about the Y axis and the oscillations of the flexible shaft forced by the second mass due to the turning of the device about the X axis.

4. A device as claimed in claim 2 in which the masses and their supports are in the form of radial spokes with the masses at their ends.

5. A device as claimed in claim 2 in which the supports for the masses are in the form of radial spokes and the masses are in the form of wheel rims.

6. A rate-of-turn device referable to three orthogonal axes: X, Y, and Z, and adapted for detecting turn or measuring rate of turn about two axes at right angles, namely the X and Y axes, said device comprising a casing, a flexible shaft lying along the Z axis, at right angles to X and Y axes, two flexible diaphragms connecting the casing to two nodal points of said flexibe shaft, two wheels supported radially on said shaft, means for imparting radial oscillation to said wheels in opposite senses, and means for measuring the amplitude of the vibrations of said shaft in the direction of the X axis, due to a component of rate of turn about the X axis, and means for measuring the amplitude of the vibrations of said shaft in the direction of the Y axis, due to a component of rate of turn about the Y axis.

7. A rate-of-turn device referable to three orthogonal axes: X, Y, and Z, and adapted for detecting turn or measuring rate of turn about two axes at right angles, namely the X and Y axes, said device comprising a casing a flexible shaft lying along the Z axis, at right angles to the X and Y axes, two flexible diaphragms connecting the casing to two nodal points of said flexible shaft, two wheels supported radially on said shaft, electromagnetic means for imparting radial oscillation to said wheels in opposite senses, and means for measuring the amplitude of the vibrations of said shaft in the direction of the X axis, due to a component of rate of turn about the X axis, and means for measuring the amplitude of the vibrations of said shaft in the direction of the Y axis, due to a component of rate of turn about the Y axis.

8. A rate-of-turn device referable to three orthogonal axes: X, Y, and Z, and adapted for detecting or measuring rate of turn about two axes at right angles, namely the X and Y axes, said device comprising a casing, a flexible shaft lying along the Z axis, at right angles to the X and Y axes, two flexible diaphragms connecting the casing to two nodal points of said flexible shaft, two wheels supported radially on said shaft, driving electromagnetic means for imparting rotational oscillation to said wheels and separate electromagnetic means appropriated to the oscillating wheels to generate a voltage and means for amplifying said voltage and for supplying the amplified voltage to the driving electromagnetic means.

9. A device as claimed in claim 8 in which an adjustable weight element is provided on the flexible shaft so that the nodal points of the shaft may be made coincident with the supports for said shaft.

10. A device as claimed in claim 8 in which are provided adjustable weighted parts on the supported masses to adjust the dynamic balance of the vibratory system so that the dynamic axis is coincident with the axis of the flexible shaft.

11. A rate-of-turn device referable to three orthogonal axes: X, Y, and Z, and responsive to rate of turn about the X and Y axes comprising a base, a member mounted on said base so as to oscillate relatively thereto, a mass mounted on said member for movement in the direction of the X axis, a second mass mounted on said member for movement in the direction of the Y axis, means for forcing said masses to oscillate, the first in the direction of the X axis and the second in the direction of the Y axis, and means for detecting independently the oscillations of said member forced by the first mass due to turning of the device about the Y axis and the oscillations of said member forced by the second mass due to turning of the device about the X axis.

12. A rate-of-turn device referable to three orthogonal axes: X, Y, and Z, and responsive to rate of turn about the X and Y axes comprising a base, a resilient member mounted thereon, a pair of masses mounted on the resilient member, means for forcing the masses to oscillate in the directions of the X and Y axes respectively, and means for selectively detecting the oscillations of the resilient member due to oscillations in the direction of the Z axis of the respective masses.

13. A rate-of-turn device referable to three orthogonal axes: X, Y, and Z, and adapted for measuring rate of turn about the X and Y axes comprising a base, a flexible shaft mounted on said base, said shaft extending in the direction of the Z axis, a pair of masses mounted on said shaft, means for forcing the masses to oscillate in the direction of the X and Y axes respectively, means for measuring oscillations of said shaft about the X axis and means for measuring oscillations of said shaft about the Y axis, said oscillations being due to oscillations of the masses along the Z axis.

14. A rate-of-turn device referable to three orthogonal axes: X, Y, and Z, and adapted for measuring rate of turn about the X and Y axes comprising a base, a flexible shaft mounted on said base, said shaft extending in the direction of the Z axis, a wheel mounted thereon, means for applying a rotational oscillation to the wheel, and means for measuring the oscillations of the shaft both about the X axis and about the Y axis.

FREDERICK WILLIAM MEREDITH.

REFERENCES CITED

The following references are of record in the file of this patent:

UNITED STATES PATENTS

| Number | Name | Date |
| --- | --- | --- |
| Re. 22,409 | Lyman et al. | Dec. 21, 1943 |